United States Patent
Shivaji-Rao et al.

(10) Patent No.: US 7,647,326 B2
(45) Date of Patent: Jan. 12, 2010

(54) METHOD AND SYSTEM FOR EVALUATING MEDIA-PLAYING SETS

(75) Inventors: Vishnu Kumar Shivaji-Rao, Vancouver, WA (US); Fernando Amat Gil, SanFrancisco, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 368 days.

(21) Appl. No.: 11/699,893

(22) Filed: Jan. 29, 2007

(65) Prior Publication Data
US 2008/0183705 A1 Jul. 31, 2008

(51) Int. Cl.
*G06F 7/00* (2006.01)
(52) U.S. Cl. .......................................................... 707/10
(58) Field of Classification Search ................ 707/8–10, 707/202, 102, 104.1; 726/22, 23
See application file for complete search history.

(56) References Cited

U.S. PATENT DOCUMENTS

| | | | |
|---|---|---|---|
| 4,264,925 A | 4/1981 | Freeman et al. |
| 4,967,337 A | 10/1990 | English et al. |
| 5,220,496 A | 6/1993 | Tanaka et al. |
| 5,235,414 A | 8/1993 | Cohen |
| 5,278,565 A | 1/1994 | Horn |
| 5,353,238 A | 10/1994 | Neef et al. |
| 5,488,427 A | 1/1996 | Kayashima et al. |
| 5,504,896 A | 4/1996 | Schell et al. |
| 5,534,911 A | 7/1996 | Levitan |
| 5,754,940 A | 5/1998 | Smith et al. |
| 5,799,311 A | 8/1998 | Agrawal et al. |
| 5,815,662 A | 9/1998 | Ong |
| 5,850,340 A | 12/1998 | York |
| 5,936,611 A | 8/1999 | Yoshida |
| 5,956,487 A | 9/1999 | Venkatraman et al. |
| 6,005,597 A | 12/1999 | Barrett et al. |
| 6,006,265 A | 12/1999 | Rangan et al. |
| 6,008,836 A | 12/1999 | Bruck et al. |
| 6,166,778 A | 12/2000 | Yamamoto et al. |
| 6,195,616 B1 | 2/2001 | Reed et al. |
| 6,202,210 B1 | 3/2001 | Ludtke |
| 6,233,611 B1 | 5/2001 | Ludtke et al. |
| 6,343,261 B1 | 1/2002 | Iwanowski et al. |
| 6,351,561 B1 | 2/2002 | Iyengar |
| 6,377,858 B1 | 4/2002 | Koeppe |

(Continued)

FOREIGN PATENT DOCUMENTS

EP 0 798 921 10/1997

(Continued)

OTHER PUBLICATIONS

Microsoft Computer Dictionary 5th edition, Microsoft Press, definitions of "Tree", "Tree Network", "parent/child", 2002.*

*Primary Examiner*—Wilson Lee
(74) *Attorney, Agent, or Firm*—Chernoff, Vilhauer, McClung & Stenzel

(57) ABSTRACT

An exemplary method and system for evaluating media-playing sets evaluates the likelihood of a selected performance condition occurring in a subject set including based on source data automatically collected from a sample group of the sets, systematic analysis of this data to form a decision tree model revealing prescribed values for characteristic input parameters that are determined to best relate to the condition, and automated comparison of the respective parameter values of the subject set to these prescribed values in order to screen each subject set for the likelihood of the condition occurring within a specified timeframe, which screening can be repeated for different conditions and timeframes using different decision tree models.

14 Claims, 11 Drawing Sheets

U.S. PATENT DOCUMENTS

| | | |
|---|---|---|
| 6,393,373 B1 | 5/2002 | Duyar et al. |
| 6,425,128 B1 | 7/2002 | Krapf et al. |
| 6,430,526 B1 | 8/2002 | Toll |
| 6,438,752 B1 | 8/2002 | McClard |
| 6,505,243 B1 | 1/2003 | Lortz |
| 6,507,762 B1 | 1/2003 | Amro et al. |
| 6,542,163 B2 | 4/2003 | Gorbet et al. |
| 6,556,960 B1 | 4/2003 | Bishop et al. |
| 6,614,187 B1 | 9/2003 | Kanzaki et al. |
| 6,614,987 B1 | 9/2003 | Ismail et al. |
| 6,633,235 B1 | 10/2003 | Hsu et al. |
| 6,725,102 B2 | 4/2004 | Sun |
| 6,727,914 B1 | 4/2004 | Gutta |
| 6,756,997 B1 | 6/2004 | Ward, III et al. |
| 6,766,283 B1 | 7/2004 | Goldman et al. |
| 6,772,096 B2 | 8/2004 | Murakami et al. |
| 6,782,495 B2 | 8/2004 | Bernklau Halvor |
| 6,789,081 B1 | 9/2004 | Vanska |
| 6,795,011 B1 | 9/2004 | Berthoud et al. |
| 6,813,775 B1 | 11/2004 | Finseth et al. |
| 6,819,364 B2 | 11/2004 | Creed et al. |
| 6,842,776 B1 | 1/2005 | Poisner |
| 6,851,090 B1 | 2/2005 | Gutta et al. |
| 6,868,292 B2 | 3/2005 | Ficco et al. |
| 6,879,350 B2 | 4/2005 | Kwon et al. |
| 6,879,973 B2 | 4/2005 | Skaaning et al. |
| 6,907,545 B2 | 6/2005 | Ramadei et al. |
| 6,915,308 B1 | 7/2005 | Evans et al. |
| 6,917,819 B2 | 7/2005 | Collins |
| 6,922,482 B1 | 7/2005 | Ben Porath |
| 6,922,680 B2 | 7/2005 | Buczak |
| 6,934,713 B2 | 8/2005 | Schwartz et al. |
| 6,947,156 B1 | 9/2005 | Jeyachandran et al. |
| 6,947,935 B1 | 9/2005 | Horvitz et al. |
| 6,947,966 B1 | 9/2005 | Oko, Jr. et al. |
| 6,951,031 B2 | 9/2005 | Hatano |
| 6,954,678 B1 | 10/2005 | Phan et al. |
| 6,954,689 B2 | 10/2005 | Hanson et al. |
| 6,957,202 B2 | 10/2005 | Skaaning et al. |
| 7,490,073 B1 * | 2/2009 | Qureshi et al. ................. 706/50 |
| 2002/0003903 A1 | 1/2002 | Engeldrum et al. |
| 2002/0116539 A1 | 8/2002 | Bryczkowski et al. |
| 2002/0140728 A1 | 10/2002 | Zimmerman |
| 2003/0046303 A1 | 3/2003 | Chen et al. |
| 2003/0061212 A1 | 3/2003 | Smith et al. |
| 2003/0084448 A1 | 5/2003 | Soundararajan |
| 2003/0084449 A1 | 5/2003 | Chane et al. |
| 2003/0110412 A1 | 6/2003 | Neville |
| 2003/0110413 A1 | 6/2003 | Bernklau-Halvor |
| 2003/0111754 A1 | 6/2003 | Hinzpeter et al. |
| 2004/0051816 A1 | 3/2004 | Ikeguchi |
| 2004/0070628 A1 | 4/2004 | Iten et al. |
| 2004/0078809 A1 | 4/2004 | Drazin |
| 2004/0143403 A1 | 7/2004 | Brandon et al. |
| 2004/0145371 A1 | 7/2004 | Bertness et al. |
| 2004/0153773 A1 | 8/2004 | Woo et al. |
| 2004/0176966 A1 | 9/2004 | Chen |
| 2004/0187168 A1 | 9/2004 | Shintani et al. |
| 2004/0207764 A1 | 10/2004 | Naoi et al. |
| 2005/0066241 A1 | 3/2005 | Gross et al. |
| 2005/0081410 A1 | 4/2005 | Furem et al. |
| 2005/0085973 A1 | 4/2005 | Furem et al. |
| 2005/0097070 A1 | 5/2005 | Enis et al. |
| 2005/0097507 A1 | 5/2005 | White et al. |
| 2005/0141542 A1 | 6/2005 | Handekyn et al. |
| 2005/0149980 A1 | 7/2005 | Yun |
| 2005/0159922 A1 | 7/2005 | Hsiung et al. |
| 2005/0159996 A1 | 7/2005 | Lazarus et al. |
| 2005/0185729 A1 * | 8/2005 | Mills ......................... 375/267 |
| 2005/0235319 A1 | 10/2005 | Carpenter et al. |
| 2006/0031400 A1 | 2/2006 | Yuh et al. |
| 2006/0150018 A1 * | 7/2006 | Cousin et al. ................. 714/26 |
| 2007/0169192 A1 * | 7/2007 | Main et al. .................... 726/22 |
| 2007/0192863 A1 * | 8/2007 | Kapoor et al. ................ 726/23 |

FOREIGN PATENT DOCUMENTS

| | | |
|---|---|---|
| EP | 0 844 788 | 5/1998 |
| EP | 1 176 503 | 1/2002 |
| EP | 1 517 259 | 3/2005 |
| GB | 2 354 902 | 4/2001 |
| WO | WO 01/033858 | 5/2001 |
| WO | WO 03/044684 | 5/2003 |
| WO | WO 2004/044789 | 5/2004 |
| WO | WO 2004/057473 | 7/2004 |
| WO | WO 2004/095456 | 11/2004 |

* cited by examiner

| | P1 | P2 | P3 | P4 | C |
|---|---|---|---|---|---|
| M1 | 3.25 | 2.66 | 4.15 | 2.95 | Y |
| M2 | 2.33 | 1.33 | 3.66 | 1.65 | Y |
| M3 | 1.33 | 4.15 | 3.99 | 2.45 | Y |
| M4 | 3.50 | 3.25 | 2.45 | 2.95 | Y |
| M5 | 3.75 | 2.15 | 3.33 | 1.25 | Y |
| M6 | 4.25 | 3.75 | 2.95 | 3.85 | Y |
| M7 | 1.66 | 4.50 | 1.95 | 2.55 | N |
| M8 | 2.66 | 1.15 | 3.15 | 3.25 | N |
| M9 | 2.99 | 3.25 | 2.80 | 3.55 | N |
| M10 | 3.99 | 3.60 | 3.45 | 2.75 | Y |

FIG. 8

METHOD AND SYSTEM FOR EVALUATING MEDIA-PLAYING SETS

BACKGROUND OF THE INVENTION

The present invention relates to a method and system for evaluating media-playing sets and relates, in particular, to a method and system suitable for evaluating media-playing sets designed for consumer use, such as a digital televisions, so as to diagnose flaws and other conditions that may arise in such sets.

As technology has advanced, media-playing sets designed for consumers have become increasingly rich in features so as to give consumers more options in configuring their respective sets. For example, one type of media-playing set, the television, was originally conceived as a standalone unit that received a handful of air broadcast channels and had a few basic controls, such as a channel selector and an on/off knob turnable for volume adjustment. In contrast, a modern television set can typically process signals from a variety of peripherals, such as a personal computer, videocassette recorder, digital video disc recorder, compact disc player, or stereo, and can accept signals from a variety of external sources, including air broadcast, cable, and satellite. The number of channels or programs received can number into the hundreds. Also, an on-screen control menu is typically employed for adjusting finely graded aspects of the picture, sound, and other operational features so that these features can be better adapted to the various media and program formats available. Moreover, hybrid forms of sets have appeared such as televisions able to process digitized signals, as in MPEG-2 or -4 format, and computers or miniplayers able to process television or other media broadcasts via a tuner card or through upstream conversion of the media signal to digitized format.

With this burgeoning array of options, however, the consumer bears an increased risk that some internal process or device in the set will malfunction or slowly degrade. One approach consumers have adopted to managing defects or degraded performance is to simply wait until the set fails or the set's performance becomes intolerable. Where the set is of the type marketed in retail stores, the consumer may bring the failed set back to the store for servicing, by a technician. However, this can be inconvenient if the set is a heavy and bulky object such as a wide-screen television. Furthermore, the consumer often has no idea which component in the set is defective and will be anxious about the repair cost. This cost can vary, moreover, depending not only on the type of defect but also on the training, skill, and resources of the particular technician performing the repair.

To avoid expensive repairs, some consumers purchase a service contract from the store or manufacturer, particularly if the set is an expensive luxury model. Alternatively, the consumer may decide to lease the equipment from a network provider to avoid bearing any repair cost. However, it is difficult in these situations for the consumer to estimate whether the cost saved offsets the extra charges incurred. In particular, the consumer not only lacks ready access to the repair history for various types of sets but also service contracts and leases can be "bundled" with other services or carry hidden fees.

Another approach to managing defects is to seek out and reduce such defects prior to consumer purchase. Thus a manufacturer may implement a stringent quality control program and test for any defects existing in the set immediately after production. Similarly, the manufacturer may impose statistical controls on the manufacturing process so as to limit deviations from known standards at each stage in production with the desired goal of achieving uniform quality in the end product.

Systems to aid in diagnosing defects have also been suggested for use by independent test technicians. Such systems may embody expert knowledge represented, for example, in the form of a decision tree. By responding to a directed series of questions framed by this decision tree, a test technician can pinpoint what type of defect has occurred from the more common types possible. This technique can help alleviate, at least to some degree, uncertainty over repair cost resulting from variation in the skill of different service technicians. However, with such systems, the quality of results can vary with the skill and experience of the expert setting up the system, the accuracy of results can suffer going from test bench to field, updating the system to incorporate the latest data can be difficult, and any errors made by technicians in their responses can result in confusion, excessive follow-up testing, and possible misdiagnosis.

A manufacturer may also track the repair record of various models in order to determine which components most frequently fail and to introduce improvements in design. For example, the manufacturer may ask users to return a survey card describing their experience with a particular set. Sometimes the data collected may not be truly representative given that many users are inclined to quickly dispose of such items in the trash. In any event, this approach only benefits future users and does little or nothing for the original consumer.

Elementary troubleshooting and recommended operating procedures are typically outlined in the manual. However, the user may lose or misplace the manual or simply not have the time or patience to locate and follow the directions. To offer another avenue for obtaining help, many manufacturers maintain call centers where users experiencing difficulties with their set can call in and speak with a live customer service representative. However, the costs of staffing such centers increases significantly based on the length and volume of the calls, so it is often impractical to offer this service for users needing help with a protracted troubleshooting procedure. In any event, diagnosing and fixing performance problems by telephone can be a frustrating and sometimes fruitless endeavor, particularly if the user lacks basic technical skills or if communication is hampered by educational or language barriers.

Accordingly, an object of the present invention includes providing a method and system for diagnosing conditions in media-playing sets suitable for the consumer market in a manner that is more efficient, convenient, and effective than previously employed.

Another object of the present invention is to provide such an improved method and system that can reduce repair frequency and costs for the consumer for the life of the set.

Yet another object of the present invention is to provide such an improved method and system that does not burden manufacturers and network providers with excessive servicing costs.

Other objects and advantages of the present invention will be apparent from the description of the invention contained hereinbelow.

SUMMARY OF THE INVENTION

In accordance with a first aspect of the present invention, a method for evaluating media-playing sets is provided, each set being characterized by a plurality of input parameters having respective values, such method comprising collecting data identifying for each member of a sample group of the sets whether a selected performance condition has occurred; analyzing this data so as to relate the selected performance condition to characteristic ones of the input parameters and, also, to prescribed values of the characteristic ones of the input parameters; and evaluating the likelihood of the selected performance condition occurring in a subject set by detecting the respective values of at least those ones of the input parameters of the subject set corresponding to the characteristic ones and comparing the respective values to the prescribed values.

In accordance with this first aspect, the source of data used for establishing the relation between the selected performance condition and the prescribed values of the characteristic input parameters is derived from a sample group comprised of the sets themselves. Thus, this data reflects the actual operating environments in which such sets operate and its accuracy is independent of the varying levels of skill, experience, and conscientiousness represented by different experts and test technicians.

Also in accordance with this first aspect, the set is evaluated to determine the likelihood of a selected performance condition occurring. In other words, relative to the set being evaluated, the flaw or other performance condition has not yet actually occurred. Hence, defect evaluation is conducted not merely retroactively (after set failure) nor preventively (before set manufacture) but prospectively (in advance of set failure). This aspect can thus be advantageously combined with and used to complement these other approaches.

By providing advance detection and warning of likely set failures, this first aspect enables flaws and other performance problems to be handled more efficiently, conveniently, and effectively than previously. Resolution can be as simple as recommending that the user switch to a new mode of use or consider early replacement of a particular component to avoid a later linked series of component failures. In this manner, the bother and expense of servicing calls or repair center visits may be reduced, delayed, or eliminated entirely.

In accordance with a second aspect of the present invention, a system for evaluating media-playing sets is provided, each set being characterized by a plurality of input parameters having respective values, such system comprising an incident database for recording data identifying for each member of a sample group of the sets whether a selected performance condition has occurred; an analyzer for analyzing this data and relating the selected performance condition to characteristic ones of the input parameters and, in particular, to prescribed values of the characteristic ones of the input parameters; and a diagnostic tool for evaluating the likelihood of the selected performance condition occurring in a subject one of the sets including by obtaining the respective values of at least those ones of the input parameters of the subject set corresponding to the characteristic ones and comparing the respective values to the prescribed values.

In accordance with this second aspect, the diagnostic tool evaluates the likelihood of a selected performance condition occurring. What is being evaluated, in other words, is a prospective condition. This system begins, more specifically, with a particular performance condition as a given possibility and then evaluates or screens the subject set for the condition to determine the likelihood of the condition later occurring in the set. Such a diagnostic system focusing on early detection may be contrasted with a diagnostic system aiming, by a process of elimination, to reduce a possible list of current conditions from many to one.

With such an advance warning system suitably in place, potential conditions can be fixed before considerably more expensive after-the-fact repairs become necessary. Also, equipment manufacturers and providers can improve manufacturing and purchasing procedures sooner and implement targeted diagnostic and training systems in time to meet any surge in demand by users and technicians. Moreover, the user can continue to draw benefits from such a system throughout the entire life of the set.

BRIEF DESCRIPTION OF THE DRAWINGS

FIG. 8 is a representative depiction of a dataset of the type assembled in accordance with the exemplary analysis procedure of FIG. 6.

DETAILED DESCRIPTION OF THE PREFERRED EMBODIMENT

I. The Exemplary Method

Figure 1:
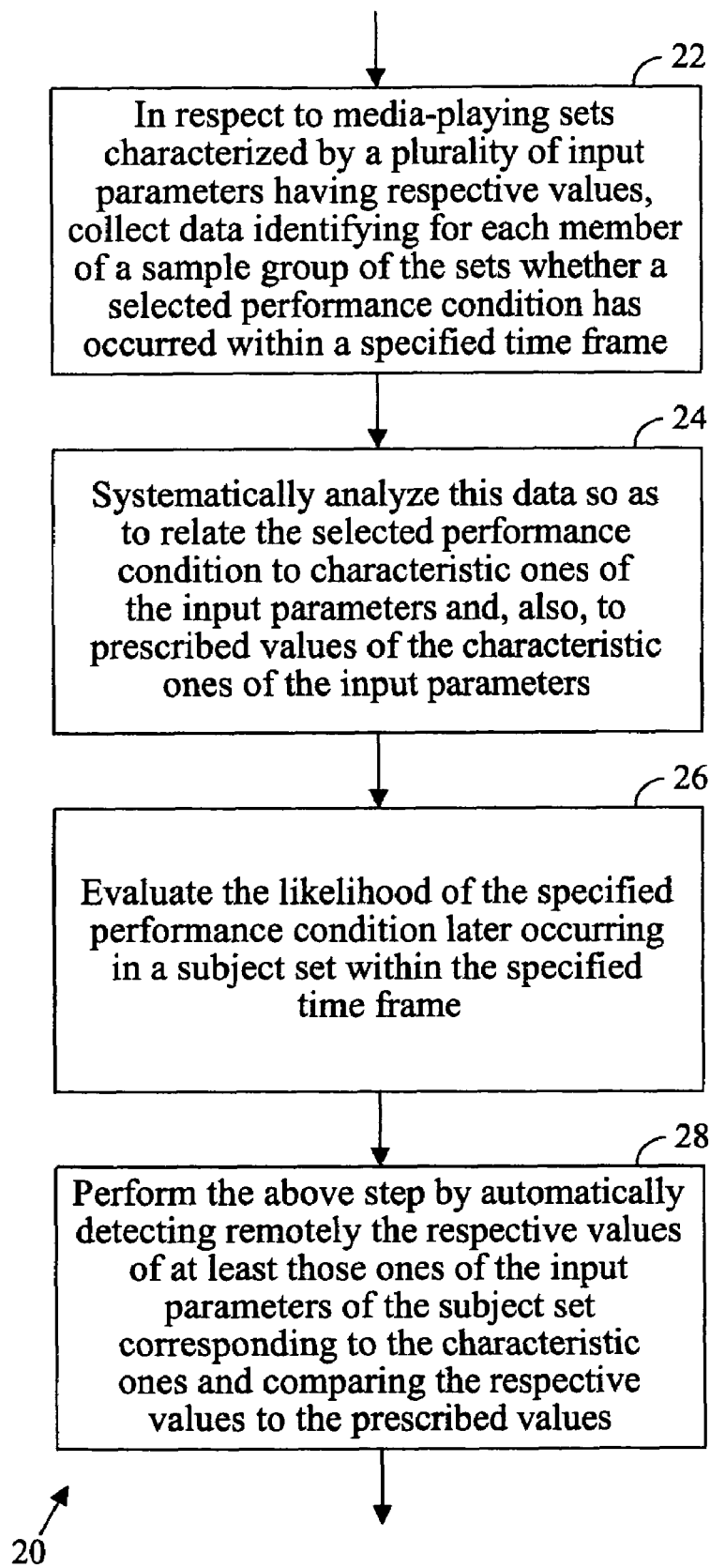
FIG. 1 is a flowchart of an exemplary method for evaluating media-playing sets as practiced in accordance with the present invention.

FIG. 1 depicts an exemplary method 20 for evaluating media-playing sets in order to determine the likelihood of a selected performance condition occurring in the subject set. This method is of particular advantage for evaluating media-playing sets for prospective conditions that are likely to occur at some time in the future, that is, that haven't occurred just yet. For example, the method might be employed to obtain advance warning of whether or not a lamp illuminating the display of the set is likely to go dim within the year.

In the following description, reference is made to the respective values of input parameters of media-playing sets. These input parameters are preferably adjustable, including by the user, and may relate to picture, sound, power, or other set characteristics. A relatively limited number of input parameters may adequately characterize the set, as with a palm-held personal digital assistant (PDA), or a relatively larger number of input parameters may be needed, as with a digital television receiver embedded within a multi-player entertainment system. As further described below, the exemplary method 20 is readily adaptable to those environments where the sets have been manufactured for wide geographic distribution such as in the consumer marketplace.

Figure 2:
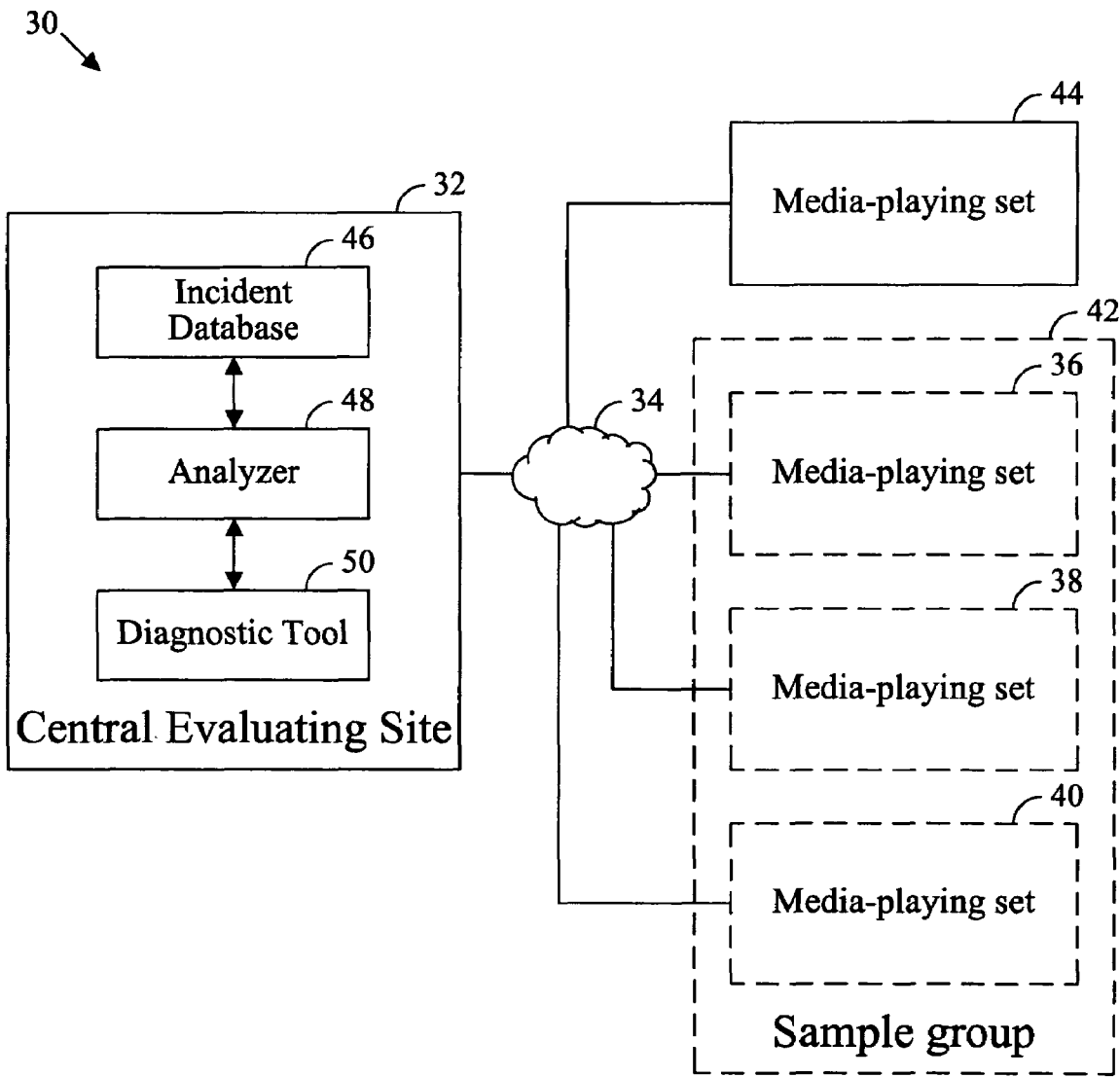
FIG. 2 is a block diagram view of an exemplary system for evaluating media-playing sets and includes a depiction of a sample group of media-playing sets from which source data is collected for analysis in accordance with the method of FIG. 1.

The exemplary method 20 addresses three general diagnostic tasks. These are 1) collecting source data; 2) analyzing this data to provide a diagnostic model; and 3) comparing a subject set to this model in order to diagnosis a condition. In relation to the data collecting task, step 22 of the exemplary method specifies collecting data identifying for each member of a sample group of the sets whether a selected performance condition has occurred within a specified timeframe. This step recognizes that the most representative data about conditions affecting the sets is provided by the sets themselves. Referring also to FIG. 2, which shows an exemplary system 30 suitable for carrying out the exemplary method, preferably this data is automatically collected remotely at a central evaluating site 32 over a network 34 from geographically distributed member sets 36, 38, and 40 belonging to the sample group 42. Hence these member sets are desirably exposed to the same environmental influences and usage patterns as the subject set 44 to be later evaluated. It may be noted that the data so collected is based entirely on objective measurement and in a manner representative of "real-life" conditions.

In relation to the data analyzing task, step 24 of the exemplary method 20 specifies analyzing the data so as to relate the selected performance condition to characteristic ones of the input parameters and, also, to prescribed values of the characteristic ones of the input parameters. Hence the diagnostic model created during this analysis step, which identifies "characteristic ones" of the input parameters and "prescribed values" for these input parameters, relates this identified information to a particular "selected performance" condition. This recognizes that the most accurate diagnostic model will initially consider the values of all the parameters to be of potential relevance in predicting any one condition instead of initially attempting to divide the parameters between the various conditions. As further described below, the analysis step can be repeated to create a separate diagnostic model for each condition to be screened. These separate models, each based on the full complement of data available as a result of this analysis step, can then be combined into a larger analytical package or system.

In relation to the diagnostic task, step 26 specifies evaluating the likelihood of the selected performance condition later occurring in a subject set within the specified timeframe. The focus of this step, then, is on prospective conditions likely to occur but that haven't occurred just yet. Moreover, the timeframe for this likely occurrence is desirably specified and, as will be clear from the discussion below, can range in practice from relatively short, where the likely occurrence is imminent, to relatively long, where the likely occurrence is still years away. Step 28 specifies performing such evaluation by automatically detecting remotely the respective values of at least those ones of the input parameters of the subject set corresponding to the characteristic ones and comparing the respective values to the prescribed values. Not only, then, is this last evaluation step relatively efficient, as it involves a straightforward comparison operation, but also the data about the subject set is desirably acquired in an automatic manner free of the possibility of any misreading traceable to human error.

II. The Exemplary System

FIG. 2 depicts an exemplary system 30 for evaluating media-playing sets that is particularly adapted for practicing the exemplary method 20 described above. In accordance with the first step of the method, source data is collected at a central evaluating site 32 over a network 34 from member sets 36, 38, and 40 of a sample group 42 of the sets. In accordance with the last step, status data is collected at the site from a subject set 44 for evaluation. As indicated by FIG. 2, the sets providing the source data and the set or sets to be evaluated derive from the same population of equivalent sets and share the same operating environment thereby ensuring that the source data collected is representative of all the sets.

At the evaluating site 32, an incident database 46 is provided for recording data identifying, initially in respect to the member sets 36, 38, and 40, whether a selected performance condition has occurred within a specified timeframe. This data is provided to an analyzer 48 that systematically analyzes it and produces a diagnostic model relating the selected performance condition to characteristic ones of the input parameters and, in particular, to prescribed values of these characteristic ones of the input parameters. A diagnostic tool 50 then uses this diagnostic model to evaluate the likelihood of the selected performance condition later occurring in the subject set 44 within the specified timeframe. It does this by obtaining or automatically detecting remotely over the network the respective values of at least those ones of the input parameters of the subject set corresponding to the characteristic ones and comparing the respective values to the prescribed values. This diagnostic tool can be implemented in hardware, firmware, or software. Furthermore, though depicted separately in FIG. 2 for ease of description, the diagnostic tool can be combined with the analyzer to form, if desired, an integrated device.

Figure 3:
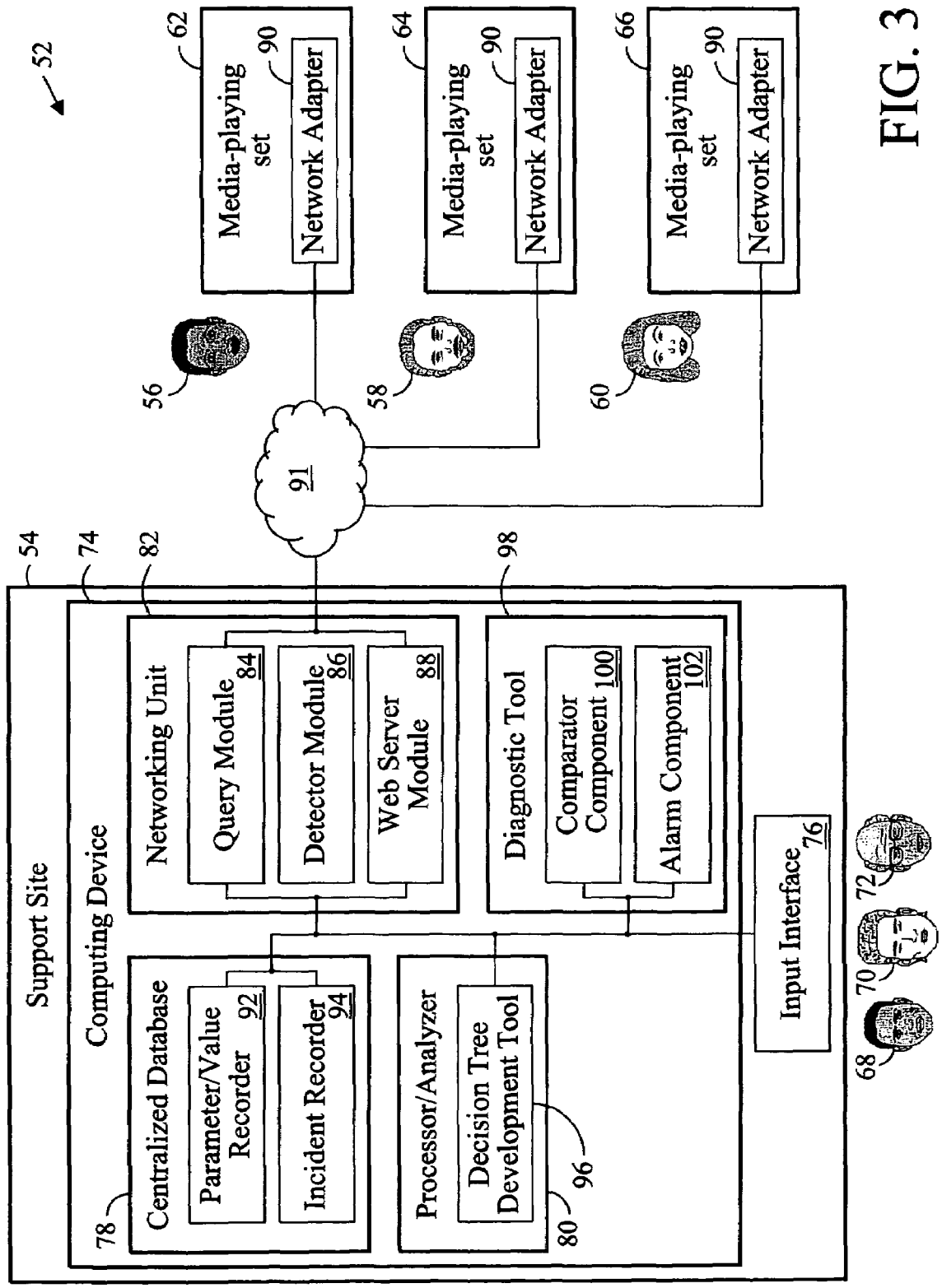
FIG. 3 is a block diagram showing details of a preferred embodiment of the system of FIG. 2 as incorporated within a customer support site and including a depiction of a plurality of media-playing sets from which status data is collected for evaluation in accordance with the method of FIG. 1.

FIG. 3 depicts a preferred embodiment 52 of the exemplary system 30 of FIG. 2 adapted for use at a customer support site or center 54. Traditionally, manufacturers have employed such centers to assist geographically dispersed users 56, 58, and 60 with operation of their respective media-playing sets 62, 64, and 66, normally through telephone interaction with support representatives 68, 70, and 72 staffing the center. Typically, such centers have included a computing device 74 accessible by the representatives through an input interface 76, such as a keyboard and display. The computing device typically has included a centralized database 78 containing support information and a processor 80 for efficiently searching the database and outlining the support information contained therein.

Referring to FIG. 3, it will be seen how the preferred embodiment 52 integrates with the above typical setup of a traditional customer support site. In order to automatically detect remotely both the source data from the member sets of the sample group and status data from the sets under evaluation, embodiment 52 includes a networking unit 82. This networking unit has a querying module 84 for automatically submitting status queries to each set, preferably at regular intervals, and a detector module 86 for automatically detecting remotely the returned status information including, in particular, the respective values of the input parameters of each set. Each media-playing set is desirably web-enabled, and the networking unit preferably also includes a web server module 88 so that when a likely condition is detected, the affected user can be alerted through a visually friendly web page providing pictures or media clips detailing appropriate actions the user may take. Each set is preferably equipped with a network adapter 90 so that full advantage can be taken of any preexisting network 91 for two-way data transmission between the networking unit and each set despite the wide geographic distribution of the sets customary in a consumer-oriented market. This network may comprise, for example, plain old telephone service (POTS) lines, digital subscriber lines (DSL), optic lines, or radio or microwave transmission paths. Preferably, suitable protocols are used to ensure the security of such transmissions, such as secure socket layers (SSL) technology, in order to prevent unauthorized eavesdropping.

The data gathered by the networking unit 82 is stored or recorded in the centralized database 78. In particular, the data relating to the respective values of the input parameters of each set, preferably collected beginning with the start of use of each member or subject set and continuing at regular intervals thereafter, is recorded to a segment of the database denoted the parameter/value recorder 92. The data relating to any performance conditions that may actually arise are recorded to a segment of the database denoted the incident recorder 94. Each piece of data collected from a respective set is preferably tagged with a set identifier and time stamp to facilitate cross-correlation and analysis of both recorded forms.

During the analysis phase, the source data initially collected from the member sets of the sample group is submitted to the processor 80. As noted in connection with the exemplary system of FIG. 2, this processor or analyzer relates the selected performance condition to characteristic ones of the input parameters and, in particular, to prescribed values of these characteristic parameters. The exemplary processor includes a decision tree development tool 96 that is designed to systematically develop or transform the subject data into a decision tree model, that is, into a diagnostic algorithm expressible as a decision tree. In this decision tree, the characteristic ones of the input parameters are represented by nodes and the prescribed values of the characteristic ones of the input parameters are represented by at least one branch extending from each node. This tree has a root node and branches leading away to other nodes and, preferably, the input parameters are ranked beginning at the root node and continuing along the branches in order from that showing the strongest correlation with the selected performance condition to that showing the weakest. An example of a decision tree model of the type just described is shown in FIG. 12. The process of transforming the source data to conform to this model is described further below in connection with FIG. 6 and FIGS. 8-11.

Preferably the decision tree model generated by the development tool 96 is recorded in the database 78 for later use in set evaluation. If, in the meantime, a selected performance condition is detected as occurring in any of the sets, the resulting incident data together with the corresponding source data is reanalyzed by the development tool and the corresponding model is updated. This ensures that the model corresponding to a selected performance condition and a specified timeframe is always kept current so as to reflect the latest data available.

The preferred embodiment 52 further includes a diagnostic tool 98 for evaluating or screening each set to determine the likelihood of the selected performance condition occurring in the set within the specified timeframe. As described above, status data including the respective values of the input parameters of each set are preferably collected by the remote detector module 86 with the beginning of use of each set and at regular intervals thereafter. The task of initiating communication between the remote networking unit 82 and each set is performed, for example, by a call-in script residing in the set's internal memory or on a readable card or disc provided with the set, which script is designed to automatically establish dial-up connection with the support site during the set's initial setup if the user chooses to participate.

The diagnostic tool 98 includes a comparator component 100 for comparing this status data with the appropriate diagnostic model developed by the processor or analyzer 80. That is, based on the selected performance condition and specified timeframe, the comparator component retrieves the corresponding decision tree model from the database 78. It then retrieves the values of at least those ones of the input parameters of the set corresponding to the "characteristic ones" of the parameters, as identified by the nodes on the decision tree, and compares each respective value to the prescribed values identified along each branch of the tree.

In reference to the decision tree model of FIG. 12, for example, if the set's detected values are 3.3 for the Backlight parameter, 4.0 for Brightness, and "2" for the Color Temperature, the comparator 100 begins by following the right branch at the root node for Backlight (since 3.3 is greater than the prescribed value of 3.225223). Next, it follows the right branch at the succeeding node for Brightness (since 4.0 is greater than 3.9604), and the middle branch at the succeeding node for Color Temperature (since 2.0 matches the prescribed value for that branch). In this manner, the comparator determines that it is likely that the set will experience a low lamp intensity level or dimming condition within the next 5 years. It will be recognized that these comparator operations can be readily implemented in software using nested if-then statements to enable efficient machine execution of the algorithm.

The diagnostic tool 98 also preferably includes an alarm component 102. If, at one of the regular intervals when the detector module 86 is monitoring each set, a change is identified in a set's respective values indicating an increased likelihood of a significantly undesirable performance condition occurring, this alarm component conveys an alarm to the web server module 88. The web server module then immediately notifies the user with an urgently marked message that includes the recommended actions the user can take.

From the above description of the preferred system embodiment 52, it will be recognized that this system provides each user with early or advance warning of selected performance conditions likely to affect their set. Such warning is normally provided in sufficient time and with sufficiently visual explanation for the user to take effective precautions. This may require nothing more than resetting the input parameters of the set or perhaps replacing a part that might otherwise prematurely fail and cause much more extensive damage. Thus, using this system, the high costs associated with servicing sets that is typically borne by the user and/or manufacturer can be delayed, reduced, or in some instances even eliminated. Moreover, this preferred system is operable for automatically diagnosing defects over the entire period the user owns the set.

The prospective (in advance of set failure) defect evaluation provided by the preferred system embodiment 52 can be combined with existing systems supporting preventative (before set manufacture) or retroactive (after set failure) evaluation in a manner effectively complementing these other approaches. FIG. 3 has shown one example where the preferred embodiment is compatibly integrated with the traditional elements of a customer support center 54. In this environment, preferably the support representatives 68, 70, and 72 have full access through the input interface 76 to the source data, status data, diagnostic models, evaluation results, and remotely acting devices of the preferred embodiment. If a defect condition should then actually occur, they can, if called upon, rely on these system components to efficiently collect more information about the condition and to better assist the user with any required repairs. On the other hand, even in the absence of any service representatives; the preferred embodiment is designed to automatically carry out its primary evaluative function.

Figure 4:
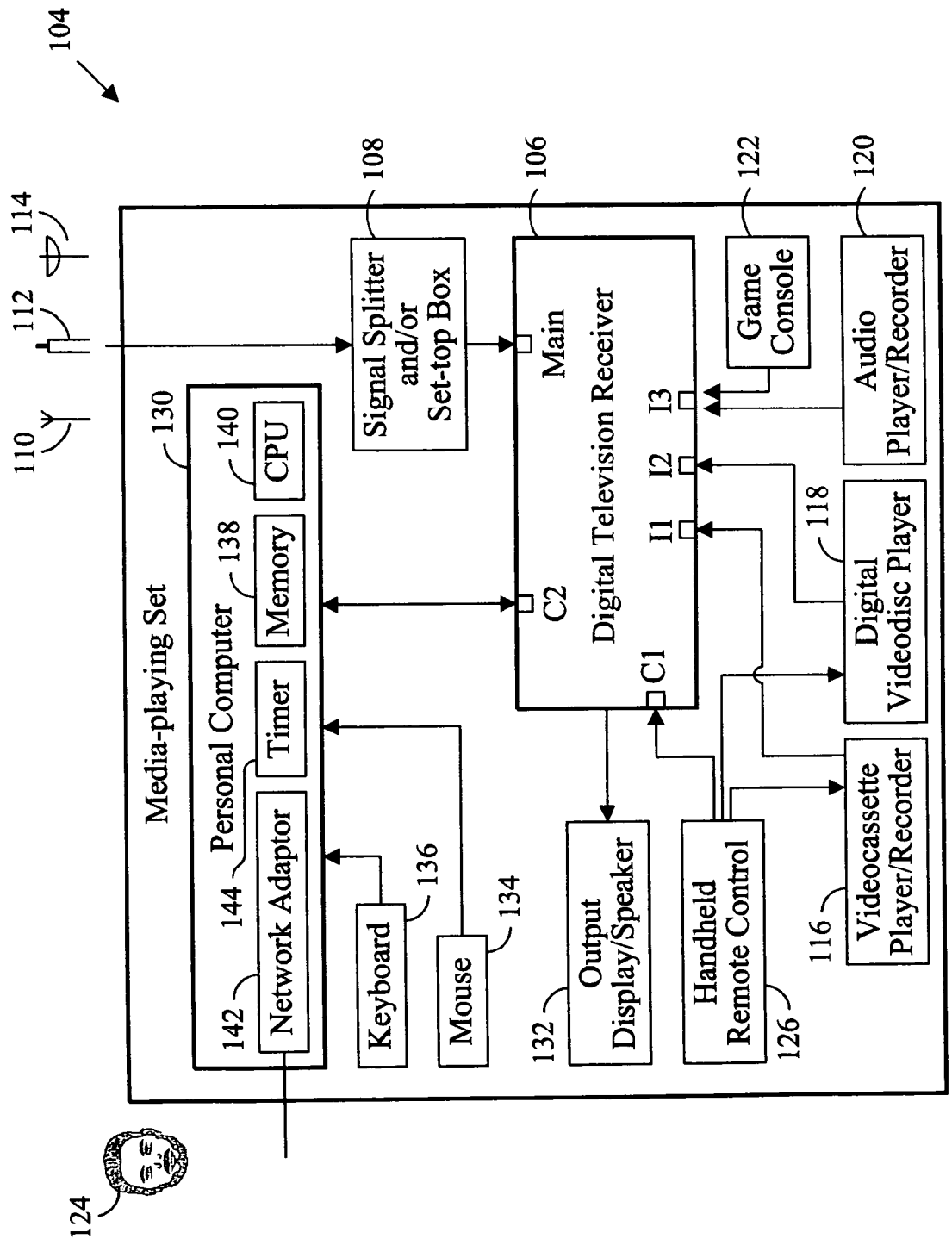
FIG. 4 is a block diagram of a media-playing set of a relatively complex type capable of being evaluated using the method and system of FIGS. 1-3.
Figure 5:
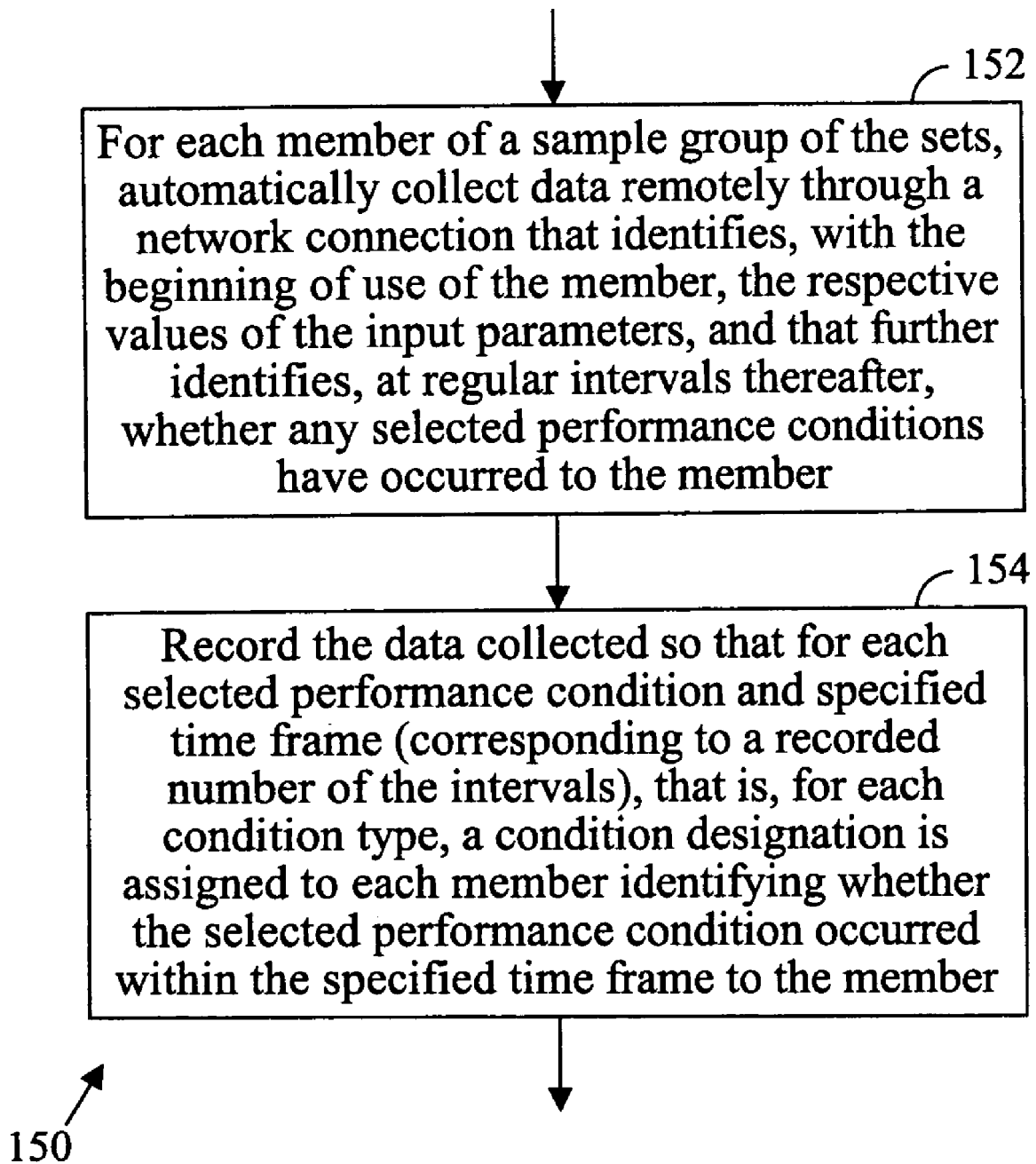
FIG. 5 is a flowchart showing details of an exemplary source data collecting procedure as practiced in accordance with the method of FIG. 1.

In FIG. 3, the consolidated computing power provided by the central main processor 80 and the large-scale memory provided by the centralized database 78 enable the preferred system embodiment 52 to process vast amounts of data as required for evaluating media-playing sets that possess a sizable number of input parameters. One example of such a media-playing set 104 is depicted in FIG. 4.

At the heart of set 104 is a digital television receiver 106. The television receiver receives its main input signal, typically through a signal splitter and/or set-top box 108, from an external broadcast antenna 110, cable link 112, or satellite dish 114; however, the receiver also accepts input signals from other media-playing components such as a videocassette player/recorder 116, digital videodisc player 118, audio player/recorder 120, or game console 122. The user 124 can control and adjust the television receiver by using a handheld remote control 126 which is also used to provide control signals to peripheral components 116 and 118. Alternatively, the user can control the set through a personal computer 130 that provides an on-screen menu displayable on a display/speaker combo 132 in alternation with the receiver output. The user can manipulate the menu items using a mouse 134 and/or keyboard 136. The personal computer conventionally includes memory 138 and a central processing unit 140. In order for the networking unit 82 of the exemplary system embodiment 52 (FIG. 3) to connect with the set, the computer is provided with a network adapter 142 and preferably is Internet-enabled for recognizing the web pages posted by the web server module 88. If desired, the computer can be provided with a timer 144, as by downloading of an appropriate software file, designed to track those intervals that the receiver is in active operation so that the particular set can be evaluated based on operational as well as absolute time intervals.

From the description just given of the media-playing set 104, it will be recognized that comprehensive diagnosis of a media-playing set can involve monitoring and evaluating the respective values of a variety of different input parameters. With set 104, for example, these values may relate to the settings for Backlight, Contrast, Brightness, Color, Tint, Color Temperature, Volume, foreground and background Opacity, View mode, Twin Picture, Treble, Bass, Balance, Power Saver mode, Input Source select, primary Signal Gain, Parental Lock settings, portable Memory Size, and so on. With its access to substantial computing and memory resources and its internal processes for systematically ordering large amounts of data, the preferred system embodiment 52 can generate valid diagnostic models and evaluations even where the underlying data derives from a large sample group and even larger subject population of such sets. The same system, of course, is equally operable for evaluating media-playing sets of simpler type such as hand-held personal digital assistants (PDA's).

III. Detailed Procedures Relating to the Exemplary Method

As described above, the exemplary method 20 of FIG. 1 can be loosely categorized into three tasks: the collection of source data, analysis of this data to generate a diagnostic model, and evaluation of each subject set using this model. The exemplary method specified for performing these tasks was described in connection with steps 22, 24, 26, and 28. Detailed exemplary procedures for performing these tasks are depicted in FIGS. 5-11, where FIG. 5 relates to the first task or step 22, FIGS. 6 and 8-11 relate to the second task or step 24, and FIG. 7 relates to the third task or steps 26 and 28. These detailed procedures are preferably used to direct the internal processes and operations of the exemplary preferred embodiment 52 described above.

IIIa. The Exemplary Source Data Collecting Procedure

In connection with the task of collecting the source data, step 22 of the exemplary method 20 (FIG. 1) specifies collecting data that identifies for each member of a sample group of the sets whether a selected performance condition has occurred within a specified timeframe. It was described above how collecting source data from members of a sample group of sets that are equivalent in type to the subject sets to be evaluated helps ensure that the data will be representative. Referring now to the detailed exemplary procedure 150 of FIG. 5, step 152 specifies, for each member of the sample group, automatically collecting the data remotely through a network connection that identifies, with the beginning of use of the member, the respective values of the input parameters, and that further identifies, at regular intervals thereafter, whether any selected performance conditions have occurred to the member. Not only does automatically collecting this source data permit such data to be rapidly collected, it also eliminates the possibility of any misreading of set information due to human error. At the same time, collecting the data remotely through a network connection enables full advantage to be taken of any preexisting networks so that the data can be readily collected from sets widely distributed geographically yet desirably operating in representative environments. The source data values provided by each member set are preferably measured with the beginning of that member's use, that is, as close to its start of use as practical. This enables a valid baseline comparison to be made with the status values of each subject set, such values being also preferably measured with the beginning of each set's use. This aspect also prevents the undetected earlier existence of poorer performance parameters among the member sets from skewing the results. At regular intervals thereafter, should any selected performance condition occur in one of the member sets, this event is duly recorded automatically.

The next step 154 of the exemplary procedure 150 involves recording the data collected so that for each selected performance condition and specified timeframe (corresponding to a recorded number of the intervals), a condition designation is assigned to each member identifying whether the selected performance condition occurred within the specified timeframe to the member. This prepares the source data for the analysis stage of the method as described below. It will be recognized that the status of more than one "selected" performance condition is normally monitored and recorded for later analysis and evaluation, and so too data for more than one "specified" timeframe is monitored and recorded relative to each condition. Each particular combination of a selected performance condition and a specified timeframe will hereinafter be termed a condition type. The timeframe is normally specified by the user depending on how far out the user wishes to screen for potential conditions. This timeframe can vary from very short, such as minutes or seconds, to very long, such as years, provided that the timeframe so specified does not exceed the number of intervals recorded.

IIIb. The Exemplary Analysis Procedure

In connection with the task of analyzing the data, step 24 of the exemplary method 20 specifies that the source data be systematically analyzed so as to relate the selected performance condition to characteristic ones of the input parameters and, also, to prescribed values of the characteristic ones of the input parameters. That is, a diagnostic model is generated in accordance with step 24 identifying characteristic ones of the input parameters and relating prescribed values for these characteristic parameters to a selected performance condition. It was described above how focusing on a single selected performance condition when constructing a diagnostic model ensured that all the available source data relating to that condition would be properly taken into account.

Figure 6:
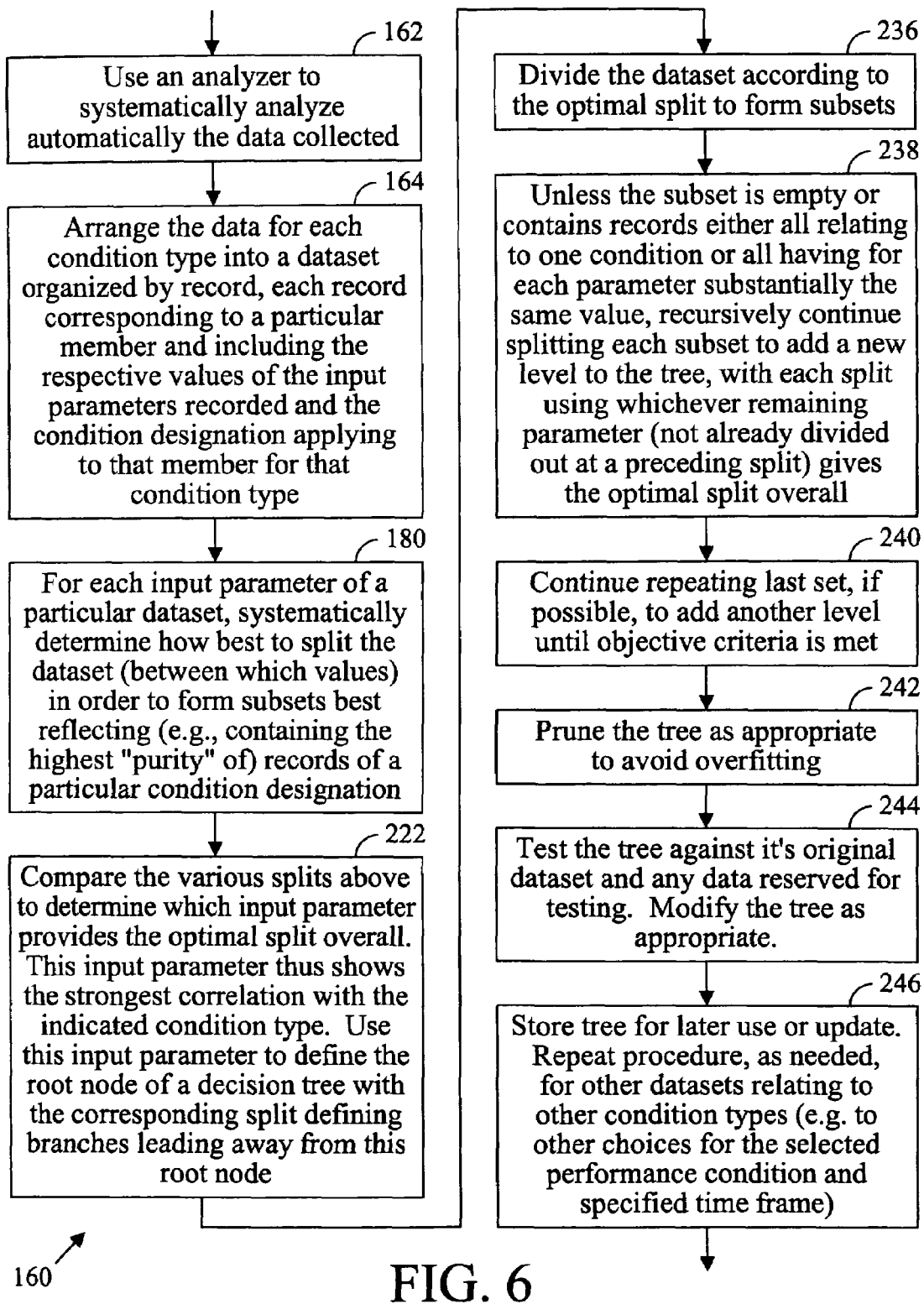
FIG. 6 is a flowchart showing details of an exemplary analysis procedure as practiced in accordance with the method of FIG. 1.

Exemplary procedure 160 of FIG. 6 provides a detailed method for systematically analyzing all of the source data relating to each particular condition type and generating a corresponding representative diagnostic model. In particular, referring also to the example depicted in FIG. 12, the procedure details how to create a decision tree model or algorithm 161 that is equivalently expressible in software code as a series of nested if-then statements in a form suitable for automatic execution.

Step 162 of the exemplary procedure 160 specifies providing an analyzer for systematically analyzing automatically the source data collected. This source data is initially collected from the members of the sample group of sets, first beginning with the use of the set and then at regular intervals thereafter. Should a condition occur in any set, whether in a member of the sample group or in a subject set under evaluation, the data for this set is directed to the incident recorder 94 (FIG. 3) and used to generate or update the corresponding model.

Step 164 specifies arranging the data for each condition type into a dataset organized by record, each record corresponding to a particular member and including the respective values of the input parameters recorded and the condition designation applying to that member for that condition type. A sample dataset 166 of the specified form is shown in FIG. 8. Here the "M" labels 168 running vertically along the left side, M1, M2, M3, and so on, identify member 1, member 2, member 3, and so on, of the sample group. The "P" headings 170 running horizontally along the top, P1, P2, P3, and so on, identify input parameter 1, input parameter 2, input parameter 3, and so on (though four headings are shown, this number can be extended to any suitable number). The "C" heading 172 at the top of the rightmost column indicates the particular condition type being analyzed (e.g. the selected performance condition and the specified timeframe which the generated model will represent). Reading along the first row or record 174 of this dataset, each record includes a member identifier (e.g., M1), the respective values 176, 177, 178, and 179, of the various input parameters P1, P2, P3, and P4, that were measured with the beginning of use of the identified member, and a condition indicator indicating whether, for the particular condition type, the condition has in fact occurred in the identified member (with "Y" denoting YES and "N" denoting NO).

The basic idea is to split this comprehensive dataset 166 into smaller datasets so that any patterns or relationships between the parameter values and the indicated condition type becomes clear. For clarity of description, the focus initially will be on only one of the parameters, say P1, though computationally, each of the parameters is separately evaluated initially preferably using parallel processing techniques for maximum efficiency. It is well to mention, at this point, that no claim is made as to the novelty of constructing a decision tree using the particular mathematical techniques that are now to be described. As it relates to a decision tree, novelty is claimed to lie instead in the application of such a model to diagnostic systems operating in the general context described above. A description of these techniques is herein provided only to facilitate a clearer understanding of the exemplary analysis procedure and the related features of the model generated thereby.

Step 180 of exemplary procedure 160 specifies systematically determining, for each input parameter, how best to split the dataset (between which values) in order to form subsets best reflecting (e.g., containing the highest "purity" of) records of a particular condition designation. It will be noted, in the dataset of FIG. 8, that the recorded values of the input parameter P1 are in haphazard arrangement, thus making it difficult to find a relationship between these values and the occurrence or absence of the indicated condition type C. With values of such numerical type (that can be plotted on the real number axis), the first step is to sort the values in order. Such sorting is shown in the reduced dataset 181 of FIG. 9 where the respective values under the P1 heading have been resorted from lowest to highest starting at the top (the records are now sequenced out of their original order as indicated by the haphazard arrangement of the member identifier labels 168). For nominal or categorical values, which have no natural ordering (such as "ON" or "OFF" for a parental lock parameter) such presorting is inapplicable.

Figure 9:
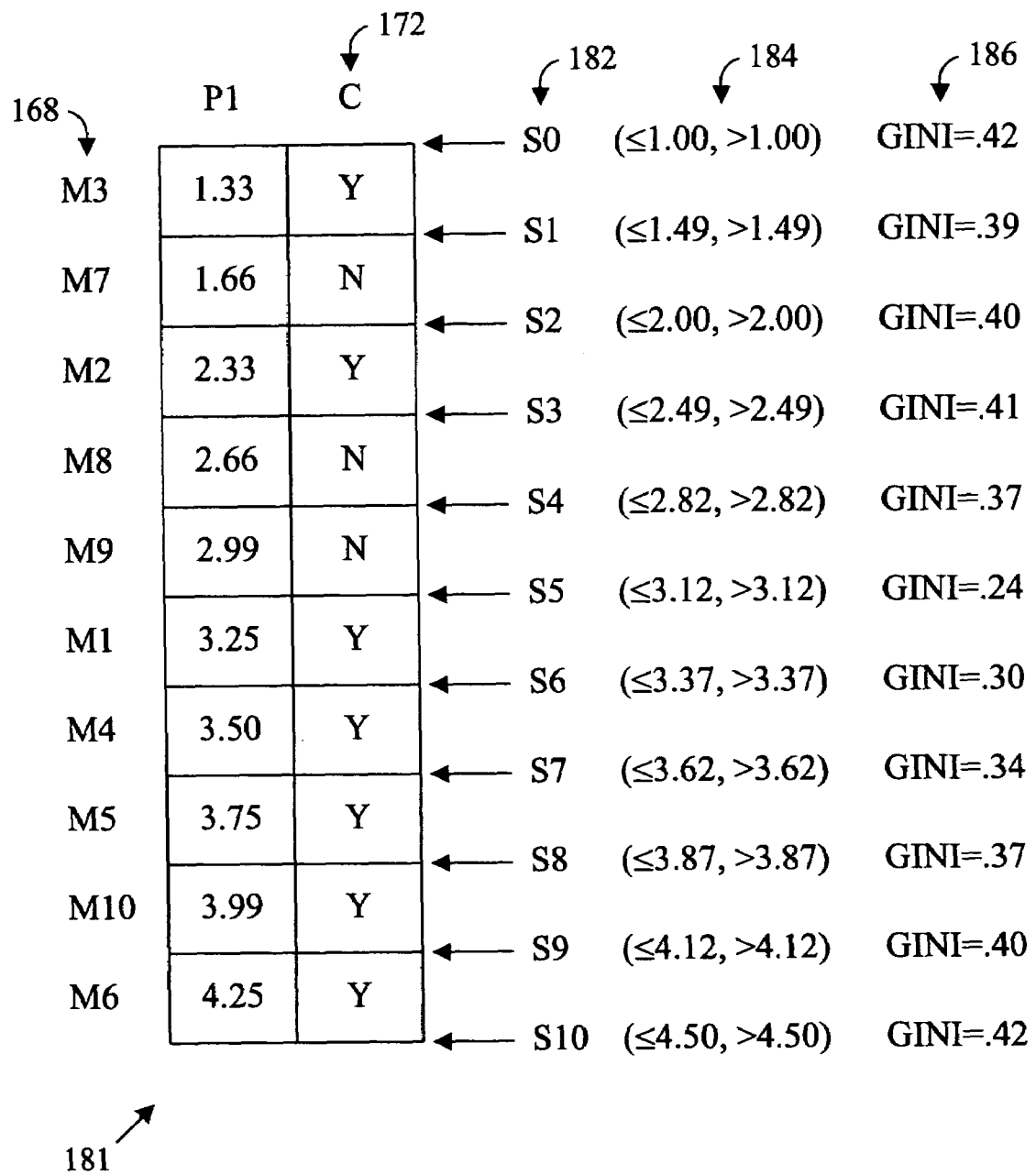
FIG. 9 depicts, in accordance with the exemplary analysis procedure of FIG. 6, how a particular parameter of the dataset of FIG. 8 is sorted and evaluated for the best split using an optimization measure.

In the reduced dataset 181 of FIG. 9, each condition designation under the condition type heading 172 has been correspondingly resorted and carried over from FIG. 8. Also, a number of possible splits 182 for partitioning this dataset have been indicated by arrows labeled S0, S1, S2, S3, and so on. Further shown are corresponding ordered pairs 184 of specific breakpoints which have been selected to relatively evenly split the parameter values. It can now be determined, in accordance with step 180, which of the splits 182 "best" partitions the values of input parameter P1 so as to provide subsets containing the "purest" (highest information or lowest entropy) mix of a particular condition designation "Y" or "N." For the particular values and designators shown in FIG. 9, we can anticipate that the "best" or "purest" split will be provided by S5 because this split divides the dataset into a lower subset containing a large relative number (5) of only the "Y" designations (hence representing maximum purity) while capturing a predominant number of "N" designations in the higher subset (3 N's and only 2 Y's). It may be noted that the preferred split is the one yielding the best purity overall for both subsets taken together. One commonly used and exemplary measure for determining the best split is the "GINI" index, with a lower index number being preferred over a higher. A column 186 listing calculated values for the GINI index are shown alongside the corresponding split points, from which it may be confirmed that split S5 does indeed represent the best split of these P1 values (its GINI index of 0.24 being the lowest). Other widely accepted measures of split quality are based on information gain, entropy, or misclassification error.

Figure 10:
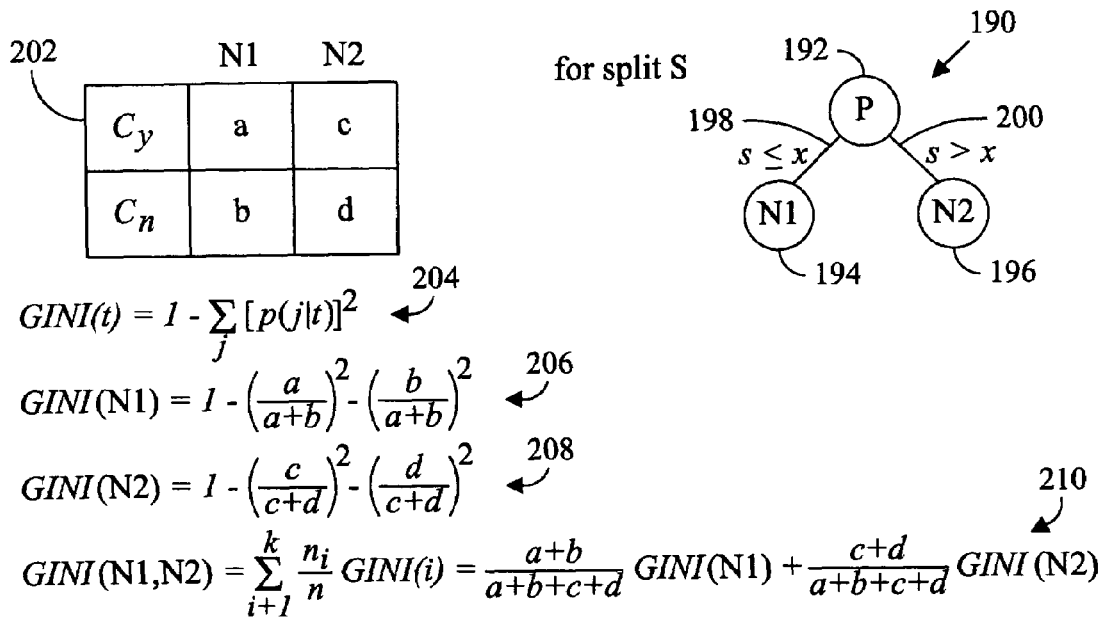
FIG. 10 depicts a generalized decision tree that splits into nodes N1 and N2, a partition table for describing the split, and generalized formulas for statistically evaluating the quality of the split using the GINI index as the optimization measure.

Referring to FIG. 10, one way to represent the above splitting of the dataset is to construct a decision tree 190, where the parent ("P") node 192 is deemed to contain the entire dataset, and each child ("N1" or "N2") node 194 or 196 is deemed to retain one or the other subset remaining after the split (multiple or nonbinary splits and child nodes are also allowed). The branches 198 and 200 of this tree indicate which subset goes where, that is, the subset having s parameter values less than or equal to x goes to node N1 and the other subset having s parameter values greater than x goes to node N2. The left side of a partition table 202 provides a count (variable "a") of how many of the individual records in the subset of node N1 relate to the "Cy" or "Y" condition and a count (variable "b") of how many relate to the "Cn" or "N" condition. The right side of the partition table provides a similar count for the records in the subset of Node 2 (using variables "c" and "d"). The best or optimal split yielding the greatest degree of correlation is that distributing only Y's or only N's in the respective subsets of nodes N 1 and N2, so that either a or b and either c or d would be zero. On the other hand, the worst split would evenly distribute Y's and N's in the respective subsets of nodes N1 and N2 so that a=b and c=d.

The primary significance of the partition table 202 is that it can be used in calculating the GINI index in conjunction with the classic GINI index formula 204. This formula states that the GINI index for a given node t is equal to one minus the summation for each class j (e.g., for both conditions Cy and Cn) of the square of the relative frequency or proportion (p) of that class as evaluated at node t. In FIG. 10, this general formula has been rewritten as two separate formulas 206 and 208 in order to clarify how to compute the GINI index of nodes N1 and N2, respectively, that is, with the expanded relative frequency terms replaced by an equivalent expression using variables a and b or c and d. Substituting in the values for a, b, c, and d that were noted in the last paragraph, it can be seen that the GINI index of a single node may range from zero (0) for the best or optimal split to one-half (0.5) for the worst (assuming a binary split). Recalling that the preferred split is the one yielding the best purity overall for both subsets (or nodes) taken together, one arrives at the final formula 210 in FIG. 10, which shows how the GINI index for both nodes taken together is calculated (involving a weighted average of the GINI index for each node).

Figure 11:
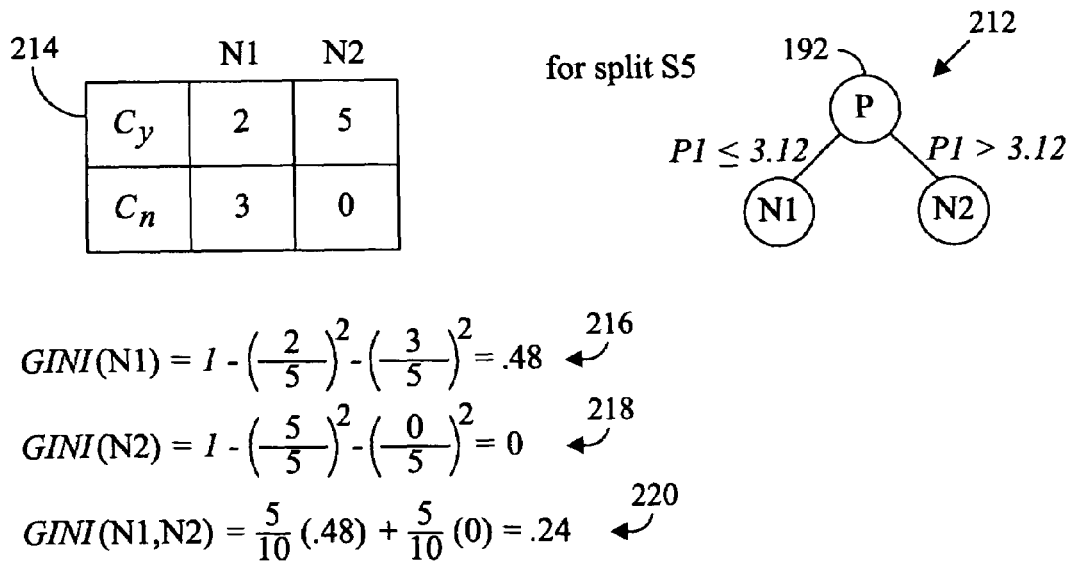
FIG. 11 shows how the GINI index of split 5 (S5) in FIG. 9 is calculated using the generalized formulas of FIG. 10.
Figure 12:
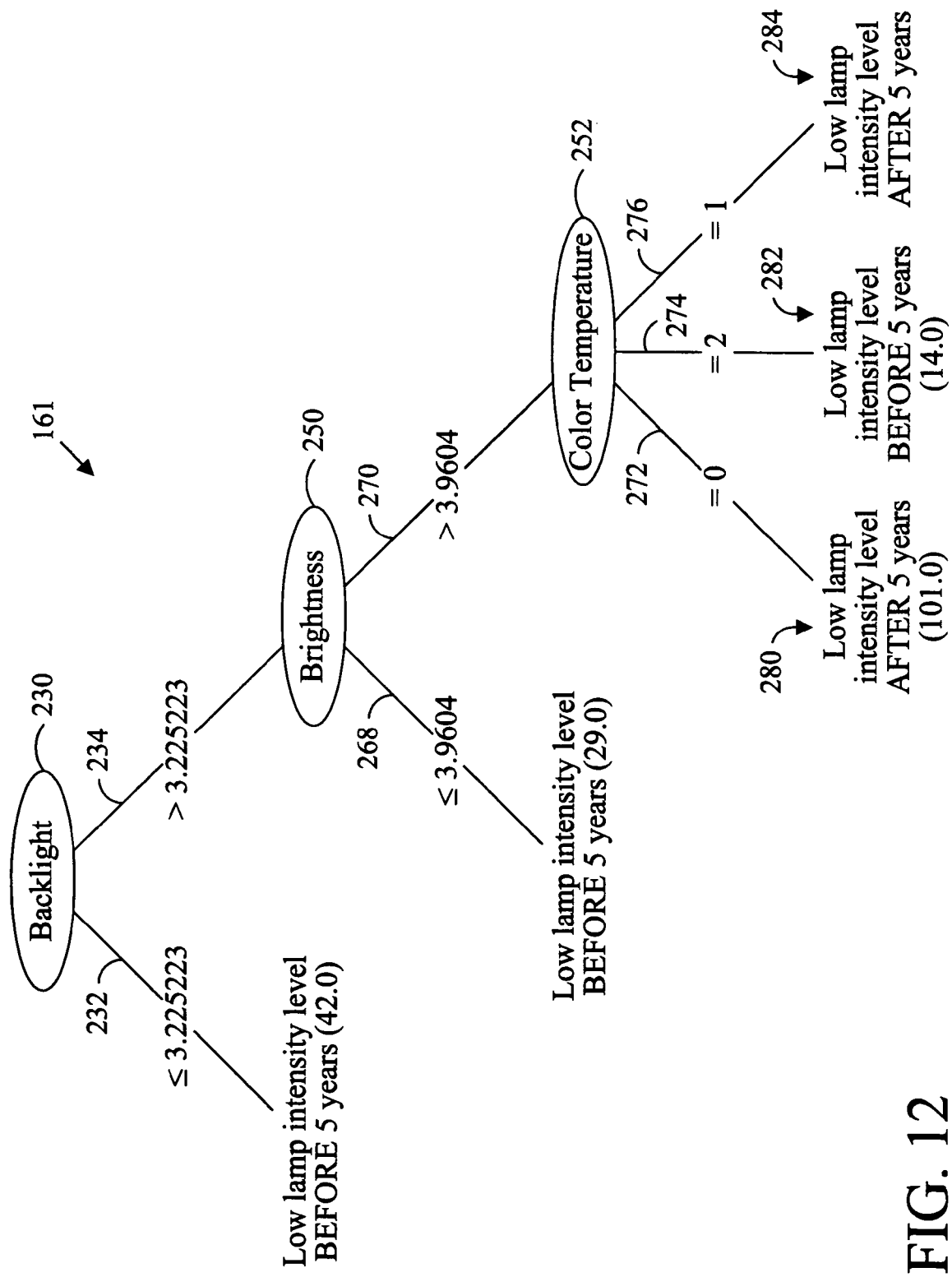
FIG. 12 shows an exemplary decision tree model constructed in accordance with the exemplary analysis procedure of FIG. 6.

FIG. 11 details how the GINI index that corresponds to split S5 of FIG. 9 is computed using the formulas of FIG. 10. Referring to decision tree 212, in accordance with the split of P1 indicated along the tree branches, node N1 retains the upper subset (where parameter P1 is less than or equal to 3.12) and node N2 retains the lower (where P1 is greater than 3.12). In the upper subset, two of the records relate to the Cy or "Y" condition and three to the Cn or "N" condition, thereby providing count values of a=2 and b=3 as shown in partition table 214. It can be anticipated that this fairly even mix of both conditions will result in a poor GINI index for N1, which formula 216 indeed confirms (0.48 being close to the worst possible index value of 0.5). Turning now to the lower subset, one finds all five of the records relating to the Cy or "Y" condition, thereby providing count values of c=5 and d=0 in table 214. Here it can be anticipated that this pure distribution relating to only one condition will result in a perfect GINI index for N2, which formula 218 confirms (zero being the best possible index value). The overall GINI index for the split is calculated by taking a weighted average of the GINI index at each node, as shown by formula 220. The resulting index value (0.24) agrees with the previously referenced index value shown for split S5 in column 186 of FIG. 9. The other index values in this column are similarly calculated.

Referring again to step 180 of FIG. 6, the best split is to be systematically determined for each input parameter. It has now been described how the best split, S5, is systematically determined for the first input parameter P1, and it will apparent that a similar procedure can be independently performed on each of the other input parameters P2, P3, and so on, to determine the best split for each. This leads directly to step 222 which specifies comparing the various splits in the last step to determine which input parameter provides the optimal split overall. For example, split S5 is the best split for input parameter P1 and provides a corresponding GINI index of 0.24. Similarly, the other input parameters P2, P3, and so on will each have their best split as measured by a corresponding GINI index. The question then becomes which, among all these input parameters, provides the optimal split overall as measured by the lowest GINI index overall. This input parameter, as step 222 point outs, shows the strongest correlation with the indicated condition type C. As step 222 further specifies, this input parameter is used to define the root node of the decision tree model or algorithm for that condition type with the corresponding split defining the branches leading away from this node. Referring to the exemplary decision tree model 161 shown in FIG. 12, for example, a procedure in accordance with that just described is used for selecting the input parameter "Backlight" as the root node 230 of the tree for the condition type of low lamp intensity level before 5 years. The breakpoints of this parameter's best split (being also the optimal split overall among all the input parameters) define the two branches 232 and 234 leading away from this node.

The next three steps 236, 238, and 240 of the detailed exemplary procedure 160 specify how to grow the rest of the decision tree. In particular, step 236 specifies dividing the dataset according to the optimal split to form subsets. In the following description, it will be assumed that P1 (and not P2, P3, or P4) is found to provide the optimal overall split (by having a best split S5 showing the lowest GINI index overall). Thus, the dataset 166 (FIG. 8) of the parent node P1 (FIG. 11), after its records are resorted to comport with the order of FIG. 9, is split along S5 (at the P1≦3.12 and P1>3.12 breakpoints) with the upper subset retained by the left node N1 and the lower subset retained by the right node N2. Each of these subsets is missing P1 since P1 is divided out at the branches of the split.

Step 238 now specifies recursively continuing to split each subset to add a new level to the tree, with each split using whichever remaining parameter now gives the optimal split overall unless, that is, the subset is empty or contains records either all relating to one condition or all having for each (remaining) parameter substantially the same value. Referring, for example, to the partition table 214 of FIG. 11, the subset at N1 resulting from split S5 doesn't meet any of the three specified subset conditions. The N1 subset is not empty of records (both counts a and b don't equal zero), it doesn't contain only "Y" or only "N" records (neither a nor b separately equals zero), and the records for at least one of the parameters P2, P3, and P4 (in fact, for all) have differing values (as seen by referring back to the parent dataset 166 of FIG. 8). On the other hand, the N2 subset contains only "Y" records (count d=zero), so that for this particular subset, one of the specified conditions is met. Accordingly, splitting of the N 1 subset, but not the N2, is recursively continued to add a second level to the tree, continuing to use, in particular, the same procedure to find the optimal split overall that we used with the parent node P1.

Step 240 specifies continuing to repeat the last step, if possible (provided the three specified subset conditions don't apply), thereby adding, for example, the third level, the fourth, the fifth, and so on, until, that is, an objective criteria is met. This objective criteria could be something as simple as limiting the tree to three levels (or, equivalently, to three parameter splits). The general idea here is to avoid "overfitting" the data by adding excessive splits that only serve to express an irrelevant relationship existing between the particular condition type and erroneous or "outlier" parameter values. As will be apparent to computer scientists familiar with the data mining literature relating to decision tree construction, limiting the levels to three is an example of an "early stopping," "pre-pruning," or "forward-pruning" rule. Other such rules that have gained acceptance include 1) stopping when each of the count values for the current subset is less than some threshold (such as 1); 2) stopping when the current split does not improve the impurity measure (e.g., based on relative parent/child GINI indexes or information gain); and 3) stopping when the resulting distributions of condition designators becomes independent of the parameter values (as measured using the "chi-squared" test).

The next step 242 specifies pruning the tree as appropriate to avoid overfitting. Here the term "pruning" is taken to mean bottom-up or "backward" pruning insofar as the tree has by now reached the maximum extent of its growth in accordance with the last three steps. One well-established method for such pruning is termed MDL for minimum description length. The basic idea here is to think of the decision tree as encoding the class labels (condition designations) of the records in the dataset and to find the tree that does this encoding using the fewest bits (for the lowest "cost" solution). The applicable formulas and computational techniques will be readily available and obvious to those of ordinary skill in the pertinent art.

Referring to step 244, this step specifies testing the tree against its original dataset and any additional data reserved for testing and then modifying the tree as appropriate. This is another useful step performable in the analysis stage that can help confirm the quality or validity of the decision tree. Here the parameter values of each record are entered as inputs into the algorithm expressed by the newly formed tree to verify whether the condition designation predicted by the tree matches the condition designation assigned to the record in the original dataset (e.g., the "Y" or "N" under the condition type heading 172 in FIG. 8). Any discrepancies are evaluated, and the tree is then modified to fix any deemed significant.

The final step in the detailed exemplary analysis procedure 160 is step 246. This step specifies storing the tree for later use or update (such update occurring when an actual condition type is reported for the sample or subject sets as described above). The step further specifies repeating the procedure, as needed, for other datasets relating to other condition types (e.g., to other choices for the selected performance condition and specified time frame). The significance of this step lies in recognizing that each decision tree model generated in accordance with the exemplary procedure is designed to screen for one and only one prospective condition type thereby enabling the model to be optimized over all the data relevant to that condition type. In accordance with this step, as many separate diagnostic models can be created as are needed to screen for any desired number of different condition types.

An exemplary decision tree model or algorithm 161, constructed in accordance with the exemplary analysis procedure 160 just described, is depicted in FIG. 12. It will be recognized that in the native language of the computer processor or analyzer (e.g., 80 in FIG. 3) designed to efficiently perform the analysis automatically (in accordance with step 162 of the procedure), this algorithm is typically embodied in a series of nested if-then statements that are expressible as a decision tree of the general form depicted.

The nodes 230, 250, and 252 of the tree 161 represent characteristic ones of the input parameters, here corresponding to Backlight, Brightness, and Color Temperature, respectively. These parameters are "characteristic" in the sense that among all the input parameters, these particular parameters have been found or determined under the exemplary procedure 160 to best characterize or represent the data. At least one branch extends from each node, such as branches 232 and 234 from root node 230, with the branches representing prescribed values of the characteristic parameters. From the above description of the procedure, it will be recognized that these prescribed values represent the split or breakpoint parameter values that best partition the source or training data to match the particular condition type modeled by the tree. Because, under the exemplary data collecting procedure, the sample sets from which the source data derives are especially chosen to be closely representative of the subject sets to be evaluated, these prescribed values should likewise partition the status data in a manner closely representing and predicting the condition type being evaluated.

Beginning with the root node and continuing along the branches, the characteristic parameters are ranked in order from that showing the strongest correlation with the selected performance condition or condition type to that showing the weakest. Hence in tree 161, the Backlight parameter shows the strongest correlation, the Brightness, the next strongest, and the Color Temperature, the third strongest. It will be recognized that this ordering is a direct result, during tree development, of successively choosing as the current node that input parameter providing the optimal split of the dataset (e.g., steps 222 and 238 in FIG. 6). Such ordering ensures, for example, that even where the levels of the tree are restricted in number, the most important or significant parameters will still be represented by the tree.

It is possible to practice the present method, at least in its broadest aspects, using a diagnostic model based on an alternative type of relational algorithm, such as one falling into the category of discriminant analysis, cluster analysis, or neural networks. However, the relative simplicity and computational efficiency of the decision tree-based model offer important advantages over these other approaches. Such evaluational efficiency, for example, enables development of a diagnostic model in which, on the one hand, the source data fully represents a selected condition permitting improved accuracy, and in which, on the other hand, the model is readily scaleable to handle a variety of condition types while computational load is kept reasonably constrained.

IIIc. The Exemplary Evaluation Procedure

In connection with the task of evaluating the data, step 26 of the exemplary method 20 specifies evaluating the likelihood of the specified performance condition later occurring in a subject set within the specified timeframe. Step 28 further specifies that this last step be performed by automatically detecting remotely the respective values of at least those ones of the input parameters of the subject set corresponding to the characteristic parameters identified in the analysis step and comparing the respective values of such input parameters to the prescribed values of these characteristic parameters. It was described above how by focusing on conditions "likely to" but not just yet occurring, that is, on prospective conditions, the method enabled advance warning to be given of potentially adverse conditions sufficiently early to prevent or delay such conditions including by relatively simple or inexpensive measures. It was also described how the ability to specify a timeframe of either short or long duration brought flexibility to the diagnostic process and how the automatic detecting and comparing steps enabled the evaluation to be performed efficiently free of any misreading of data due to human error.

Figure 7:
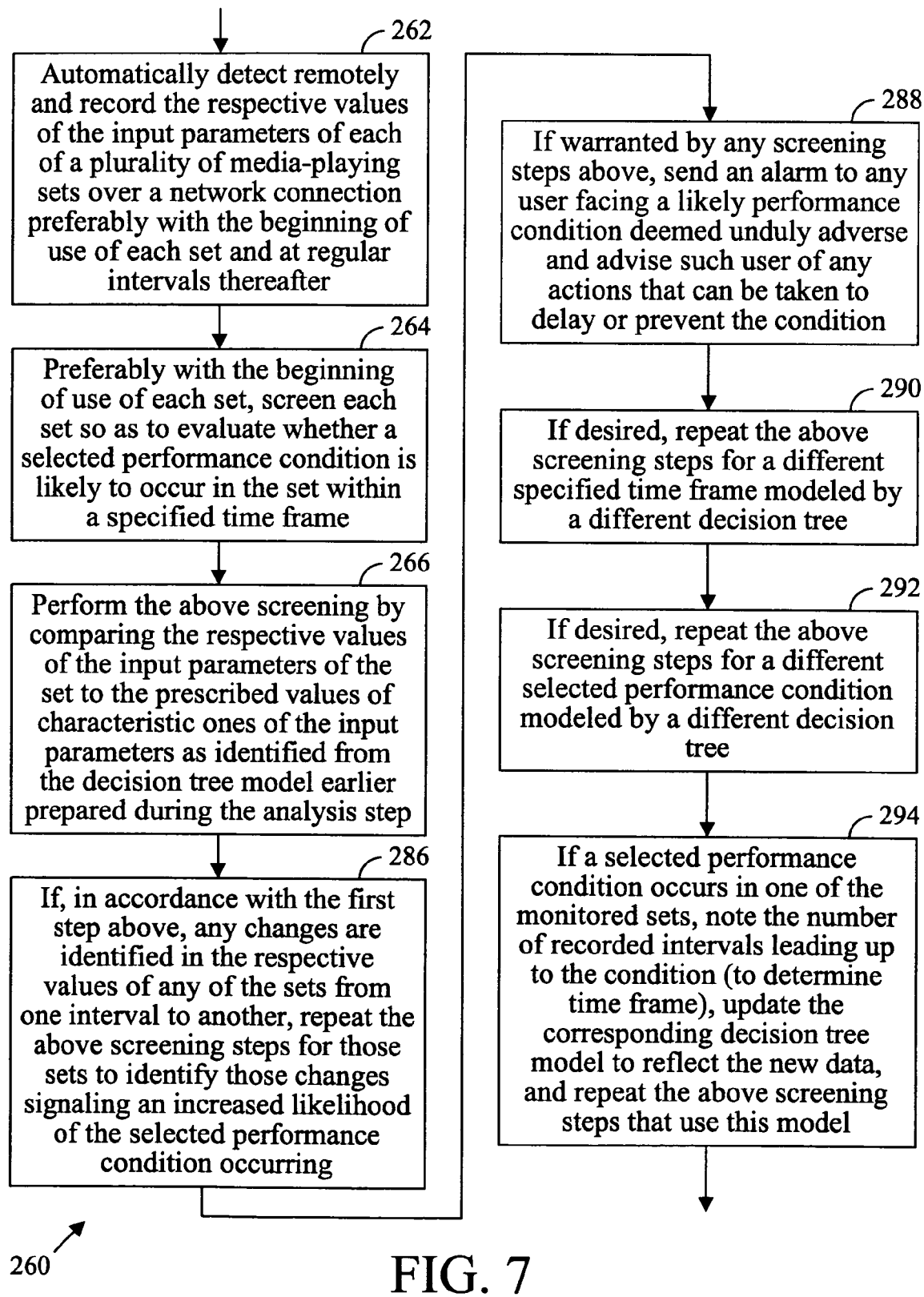
FIG. 7 is a flowchart showing details of an exemplary evaluation procedure as practiced in accordance with the method of FIG. 1.

Referring now to the exemplary evaluation procedure 260 of FIG. 7, step 262 specifies automatically detecting remotely and recording the respective values of the input parameters of each of a plurality of media-playing sets over a network connection preferably with the beginning of use of each set and at regular intervals thereafter. This step, involving automatic and remote data monitoring of subject sets for purposes of evaluation, may be compared to step 152 (FIG. 5), which involved similar monitoring of member sets of the sample group for purposes of source data collection. In both cases, such monitoring is specified to occur over a network connection enabling full use to be made of any preexisting network and further ensuring that the source data collected accurately models the effects of the transmission medium on the data being evaluated. In both cases also, parameter data is detected or collected with beginning of use of each set enabling conclusions drawn from one data set to be applied with validity to the other. This prevents, for example, a set with a former history of poor settings and performance from negatively skewing unduly the source or update data based only on its current settings.

Step 264 specifies screening each set, preferably with the beginning of use of the set, so as to evaluate whether a selected performance condition is likely to occur in the set within a specified timeframe. Such evaluation, which starts immediately with the beginning of use, enables the user to take immediate action to preserve the optimal functioning of the set should such action be deemed advisable based on the evaluation results.

Step 266 specifies performing the above screening by comparing the respective values of the input parameters of the set to the prescribed values of characteristic ones of the input parameters as identified from the decision tree model earlier prepared during the analysis step. As an example, take a set in which the current parameter values detected are as follows: Brightness 4.12, Saturation 2.13, Color Temperature "2," Tint 3.14, and Backlight 3.23. Assume, in this example, that the condition type being evaluated is a selected performance condition of "low lamp intensity level" (undue dimness) in combination with a specific timeframe of "before 5 years." The particular diagnostic model corresponding to this condition type is recalled from the centralized database 78 of FIG. 3 (where it was earlier stored in accordance with step 246 of FIG. 6). Assume further that this diagnostic model corresponds to the decision tree model 161 show in FIG. 12.

Continuing with the above example, it is first noted that the set's input parameters for Saturation and Tint do not correspond to any of the "characteristic" parameters identified for this condition type by nodes 230, 250, and 252 of the decision tree, and thus these input parameters are disregarded. Starting at the root node 230, the set's respective value for Backlight of 3.23 is compared to the prescribed or breakpoint values for that parameter given along branches 232 and 234. Since 3.23 is greater than the prescribed value of 3.225223, the right branch is followed to the next node. Here, the set's respective value for Brightness of 4.12 is compared to the prescribed values for that parameter given along branches 268 and 270. Since 4.12 is greater than the prescribed value given of 3.9604, the right branch 270 is followed to the next node. Finally, the set's Color Temperature of "2" is compared to the prescribed values for that parameter given along branches 272, 274, and 276. Since "2" equates to the prescribed value given by the middle branch, that branch is followed to the middle result 282, which predicts "low lamp intensity level BEFORE 5 years." If the set's current parameter values were different, the result might be different (e.g., refer to 280) or the same (e.g., refer to 284) depending on the specific values involved. It will be recognized that the operations just described, which entail only four comparison steps, are performable by a modern processor with extreme speed and efficiency thereby allowing enabling this processor to repeat this evaluation for as many other condition types as might reasonably be desired without unduly burdening processing capacity.

The next step 286 specifies that if, in accordance with the above status monitoring step 262, any changes are identified in the respective values of any of the sets from one interval to another, then the above screening steps are to be repeated for those sets to identify those changes signaling an increased likelihood of the selected performance condition occurring. Step 286 recognizes that it is normally only when changes occur in the respective values of each set that these respective values need to be reevaluated because the prescribed values of the models normally do not change except when a diagnostic model is occasionally updated. This permits conservation of computing resources since the screening schedule doesn't need to be as frequent as the regular intervals of the status monitoring schedule.

Step 288 specifies, if warranted by any screening steps above, sending an alarm to any user who faces a likely performance condition deemed unduly adverse and advising such user of any actions that can be taken to delay or prevent the condition. Such actions can be as simple as readjusting the input parameters of the indicated set. The alarm component 102 and web server module 88 described above in connection with the preferred system embodiment 52 (FIG. 3) assist in this process by immediately triggering the alarm when such a condition is detected and by providing recommendations in the form of web pages that are sufficiently visual to enable the user to easily follow any described actions. Because such actions are preventive in nature and not remedial, typically they will involve expenditure of considerably less time and expense than is otherwise likely (e.g., than after-the-fact repairs).

Steps 290 and 292 of the exemplary evaluation procedure specify repeating the above screening steps, if desired. Step 290 involves repeating the above screening for a different specified timeframe modeled by a different decision tree (e.g., while holding the selected performance condition the same). Step 292 involves repeating the above screening for a different selected performance condition modeled by a different decision tree (e.g., while holding the specified timeframe the same). These steps emphasize that multiple screenings for multiple condition types are permitted involving a change in the specified timeframe, the selected performance condition, or both.

Step 294 specifies certain procedures if a selected performance condition occurs in one of the monitored sets. These include noting the number of recorded intervals leading up to the condition (to determine timeframe), updating the corresponding decision tree model to reflect the new data, and repeating the above screening steps that use this model. In other words, the exemplary method specifies an "intelligent"

process in which the system continuously "learns" not just from source or training data provided by members of the sample group but also from any data gathered from any set in which a selected performance condition has occurred (e.g., as recorded by the incident recorder 94 of FIG. 3). This enables a system operating under the exemplary method to diagnose accurately the various condition types despite gradual changes in the condition types encountered.

An exemplary method and system for evaluating media-playing sets has now been described which, in particular, evaluates the likelihood of a condition occurring in a subject set, that is, in advance of the condition actually occurring. It will be evident to those of ordinary skill in the art that at least certain substitutions and combinations other than those set forth above are possible and that the particular structures, operations, and orderings of tasks described may be subject to alteration without, in fact, significantly deviating from the core teachings and essential elements of the present invention. The terms and expressions employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for evaluating a likelihood of degradation of equipment in media-playing sets measured over at least one future interval, each set being characterized by a plurality of input parameters, each having respective value ranges, said method comprising the steps of:
   (a) collecting data identifying for each member of a sample group of said sets whether a selected performance attribute of said equipment has degraded below a threshold;
   (b) analyzing said data so as to relate said selected performance attribute to selected ones of said input parameters and, also, to selected values within their respective ranges of said selected ones of said input parameters;
   (c) evaluating the likelihood of said selected performance attribute degrading below said threshold during a one of said at least one future interval in an individual one of said media-playing sets by detecting the respective values of at least those ones of said input parameters of said individual one of said media playing sets corresponding to said selected ones of said input parameters and comparing said respective values to said selected values; and
   (d) remotely alerting a user of said individual one of said media-playing sets, through said individual one of said media-playing sets, of the evaluated said likelihood of said selected performance attribute degrading below said threshold during said one of said at least one future interval.

2. The method of claim 1 wherein said analyzing step includes developing a diagnostic algorithm expressible as a decision tree, said selected ones of said input parameters being represented by nodes on said tree and said selected values of said selected ones of said input parameters being represented by at least one branch extending from each node.

3. The method of claim 2 wherein said decision tree has a root node and branches leading away to other nodes, said selected ones of said input parameters being ranked beginning at said root node and continuing along said branches in order from that showing the strongest correlation with said selected performance attribute to that showing the weakest.

4. The method of claim 1 further including adapting said method to a plurality of media-playing sets dispersed over locations geographically remote from each other by providing a support site that communicates through a network connection with each media-playing set and remotely detecting said respective values of each set from said support site.

5. The method of claim 4 including regularly detecting said respective values of each set from said support site to identify changes in said respective values signaling an increased likelihood of said performance attribute occurring in at least one of said sets.

6. The method of claim 1 further including the steps of evaluating the likelihood of said selected performance attribute degrading below said threshold during a second one of said at least one future interval in said individual one of said media-playing sets and remotely alerting the user of said individual one of said media-playing sets, through said individual one of said media-playing sets, of the evaluated said likelihood of said selected performance attribute degrading below said threshold during said second one of said at least one future interval.

7. The method of claim 4 wherein said analyzing step includes developing a diagnostic algorithm expressible as a decision tree for use in said comparing step and updating said algorithm by modifying said decision tree whenever said support site detects said selected performance attribute has occurred in one of said plurality of media-playing sets.

8. A system for evaluating a likelihood of degradation of equipment in media-playing sets measured over at least one future interval, each set being characterized by a plurality of input parameters, each having respective value ranges, said system comprising:
   (a) an incident database capable of recording data identifying for each member of a sample group of said sets whether a selected performance attribute of said equipment has degraded below a threshold;
   (b) an analyzer capable of analyzing said data and relating said selected performance attribute to selected ones of said input parameters and, in particular, to selected values within their respective ranges of said selected ones of said input parameters;
   (c) a diagnostic tool capable of evaluating the likelihood of said selected performance attribute degrading below said threshold during a one of said at least one future interval in an individual one of said media-playing by obtaining the respective values of at least those ones of said input parameters of said individual one of said media-playing sets corresponding to said selected ones of said input parameters and comparing said respective values to said selected values; and
   (d) a communication tool capable of remotely alerting a user of said individual one of said media-playing sets, through said individual one of said media-playing sets, of the evaluated said likelihood of said selected performance attribute degrading below said threshold during said one of said at least one future interval.

9. The system of claim 8 wherein said analyzer, in performing the analyzing operation, develops a diagnostic algorithm expressible as a decision tree, said selected ones of said input parameters being represented by nodes on said tree and said selected values of said selected ones of said input parameters being represented by at least one branch extending from each node.

10. The system of claim 9 wherein said decision tree has a root node and branches leading away to other nodes, said selected ones of said input parameters being ranked beginning at said root node and continuing along said branches in order from that showing the strongest correlation with said selected performance condition to that showing the weakest.

11. The system of claim 8 further including a support site, a network adapter in each set enabling network connection to said support site despite a plurality of said sets being geographically dispersed remotely from each other, and a detector at said site for remotely detecting status information about each set including the respective values of said input parameters of each set.

12. The system of claim 11 wherein said detector regularly detects said respective values of each set from said support site to identify changes in said respective values signaling an increased likelihood of said performance condition occurring in at least one of said sets.

13. The system of claim 12 further including an alarm at said site for remotely alerting the user of said at least one of said sets where said increased likelihood of said performance condition occurring is deemed undesirable.

14. The system of claim 11 wherein said analyzer develops a diagnostic algorithm expressible as a decision tree for use by said diagnostic tool in said comparing operation and said algorithm is updated by said analyzer modifying said decision tree whenever said support site detects said selected performance condition has occurred in one of said plurality of media-playing sets.

* * * * *

UNITED STATES PATENT AND TRADEMARK OFFICE
CERTIFICATE OF CORRECTION

PATENT NO. : 7,647,326 B2
APPLICATION NO. : 11/699893
DATED : January 12, 2010
INVENTOR(S) : Vishnu Kumar Shivaji-Rao et al.

It is certified that error appears in the above-identified patent and that said Letters Patent is hereby corrected as shown below:

Col. 20, line 43 (Claim 8(c))
Change "one of said media-playing by" to --one of said media-playing sets by--.

Signed and Sealed this

Twenty-fifth Day of May, 2010

David J. Kappos
*Director of the United States Patent and Trademark Office*